US 8,442,971 B2

(12) United States Patent
Bestgen et al.

(10) Patent No.: US 8,442,971 B2
(45) Date of Patent: May 14, 2013

(54) EXECUTION PLANS WITH DIFFERENT DRIVER SOURCES IN MULTIPLE THREADS

(75) Inventors: Robert J. Bestgen, Rochester, MN (US); Robert V. Downer, Rochester, MN (US); Brian R. Muras, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 12/974,538

(22) Filed: Dec. 21, 2010

(65) Prior Publication Data

US 2012/0158698 A1 Jun. 21, 2012

(51) Int. Cl.
*G06F 7/00* (2006.01)
*G06F 17/30* (2006.01)

(52) U.S. Cl.
USPC .......................................... 707/718; 707/719

(58) Field of Classification Search ........................ None
See application file for complete search history.

(56) References Cited

U.S. PATENT DOCUMENTS

| 6,804,678 B1 | 10/2004 | Luo et al. |
| 7,437,349 B2 | 10/2008 | Basu et al. |
| 2005/0097078 A1 | 5/2005 | Lohman et al. |
| 2005/0289102 A1 | 12/2005 | Das et al. |
| 2008/0177722 A1 | 7/2008 | Lohman et al. |
| 2009/0094192 A1 | 4/2009 | Bestgen et al. |

OTHER PUBLICATIONS

Robert J. Bestgen et al., U.S. Appl. No. 12/630,950, filed Dec. 4, 2009.
"Look Ahead Predicate Generation (LPG)," http://publib.boulder.ibm.com/infocenter/iseries/v5r4/topic/rzajq/rzajq1pg.htm, Oct. 27, 2010, p. 1.
Robert J. Bestgen et al., U.S. Appl. No. 12/885,847, filed Sep. 20, 2010.

*Primary Examiner* — Hosain Alam
*Assistant Examiner* — Azam Cheema
(74) *Attorney, Agent, or Firm* — Owen J. Gamon

(57) ABSTRACT

In an embodiment, a first driver source specified by a first execution plan that implements a query is designated, and a second driver source specified by a second execution plan that implements the query is designated. A portion of the first execution plan and a portion of the second execution plan are executed. If a unique identifier of a first row returned by the executing the portion of the first execution plan does not match all unique identifiers of all rows from the second driver source that were saved to a result set by the executing the portion of the second execution plan, then the first row returned by the executing the portion of the first execution plan is added to the result set and the unique identifier of the first row that was returned by the executing the portion of the first execution plan is added to a unique identifier log.

18 Claims, 6 Drawing Sheets

EXECUTION PLANS WITH DIFFERENT DRIVER SOURCES IN MULTIPLE THREADS

FIELD

An embodiment of the invention generally relates to computer systems and more particularly to database management systems that process queries with execution plans.

BACKGROUND

Computer systems typically comprise a combination of computer programs and hardware, such as semiconductors, transistors, chips, circuit boards, storage devices, and processors. The computer programs are stored in the storage devices and are executed by the processors. Fundamentally, computer systems are used for the storage, manipulation, and analysis of data.

One mechanism for managing data is called a database management system (DBMS) or simply a database. Many different types of databases are known, but the most common is usually called a relational database (RDB), which organizes data in tables that have rows, which represent individual entries, tuples, or records in the database, and columns, fields, or attributes, which define what is stored in each entry, tuple, or record. Each table has a unique name within the database and each column has a unique name within the particular table. The database also has one or more indexes, which are data structures that inform the DBMS of the location of a certain row in a table given an indexed column value, analogous to a book index informing the reader of the page on which a given word appears.

The most common way to retrieve data from a database is through statements called database queries, which may originate from user interfaces, application programs, or remote computer systems, such as clients or peers. A query is an expression evaluated by the DBMS, in order to retrieve data from the database that satisfies or meets the criteria or conditions specified in the query. Although the query requires the return of a particular data set in response, the method of query execution is typically not specified by the query. Thus, after the DBMS receives a query, the DBMS interprets the query and determines what internal steps are necessary to satisfy the query. These internal steps may comprise an identification of the table or tables specified in the query, the row or rows selected in the query, and other information such as whether to use an existing index, whether to build a temporary index, whether to use a temporary file to execute a sort, and/or the order in which the tables are to be joined together to satisfy the query. When taken together, these internal steps are referred to as an execution plan. The DBMS often saves the execution plan and reuses it when the user or requesting program repeats the query, which is a common occurrence, instead of undergoing the time-consuming process of recreating the execution plan.

Many different execution plans may be created for any one query, each of which would return the same data set that satisfies the query, yet the different execution plans may provide widely different performance. Thus, the execution plan selected by the DBMS needs to provide the required data at a reasonable cost in terms of time and hardware resources. Hence, the DBMS often creates multiple prospective execution plans and then chooses the best, fastest, or least expensive one, to execute. One factor that contributes to the cost of a particular execution plan is the number of rows that the execution plan, when executed, returns from the database tables. One important aspect that influences the number of rows processed is the join order of the tables. In response to a query that requests data from multiple tables, the DBMS joins rows from these multiple tables (the rows are often concatenated horizontally into a result set), in order to find and retrieve the data from all the tables. Thus, a join operation is a relationship between two tables accessed by a query (a join query), and a join operation is performed to connect (or join) data from two or more tables, wherein the DBMS joins rows with particular attributes together to form a new row that the DBMS saves to the result set. The join order is typically specified by the execution plan and is the order in which the DBMS performs join operations when the DBMS executes the query via the execution plan, to retrieve and join rows of data from the database tables into the result set.

Join operations are typically implemented using a nested loop algorithm, where the resultant new rows from the first two tables in the join order are joined to the resultant rows from the third table, and those results are joined to the fourth table, etc. Eventually all of the needed join operations are complete, and the resultant new rows are stored to the result set that satisfies the query. Because a single join is limited to accessing two tables, multi-table joins are performed in sequence according to a particular order. Many different join queries may be implemented by joining the tables in any of several possible join orders. For example, a query that involves joining tables A, B, and C may be performed as a join of tables A and B followed by a join of the results of table A joined to table B and table C. Alternatively, the same query may be performed as a join of tables A and C followed by the join of the results of table A joined to table C and table B. The DBMS attempts to select a join order that eliminates the greatest number of rows from the potential result set early in the join processing, which saves the costs associated with repeatedly accessing tables later in the join operation.

The DBMS often evaluates certain characteristics about the tables A, B, and C, in an attempt to determine the best join order for the query. In particular, during runtime, one join operation may have a high fan-out rate in which each row of table A matches multiple rows in table B. If this join is performed first, then each of these matching rows will need to be joined to table C, thereby requiring a significant number of intermediate operations. Conversely, the other join operation may have a high fan-in rate in which each row of table A matches very few or zero rows in table C. If this join operation is performed first, then only a few rows need to be joined with table B, thereby saving a number of intermediate operations.

SUMMARY

A method, computer-readable storage medium, and computer system are provided. In an embodiment, a first driver source specified by a first execution plan that implements a query is designated, and a second driver source specified by a second execution plan that implements the query is designated. A portion of the first execution plan and a portion of the second execution plan are executed. If a unique identifier of a first row returned by the executing the portion of the first execution plan does not match all unique identifiers of all rows from the second driver source that were saved to a result set by the executing the portion of the second execution plan, then the first row returned by the executing the portion of the first execution plan is added to the result set and the unique identifier of the first row that was returned by the executing the portion of the first execution plan is added to a unique identifier log.

It is to be noted, however, that the appended drawings illustrate only example embodiments of the invention, and are therefore not considered a limitation of the scope of other embodiments of the invention.

DETAILED DESCRIPTION

Figure 1:
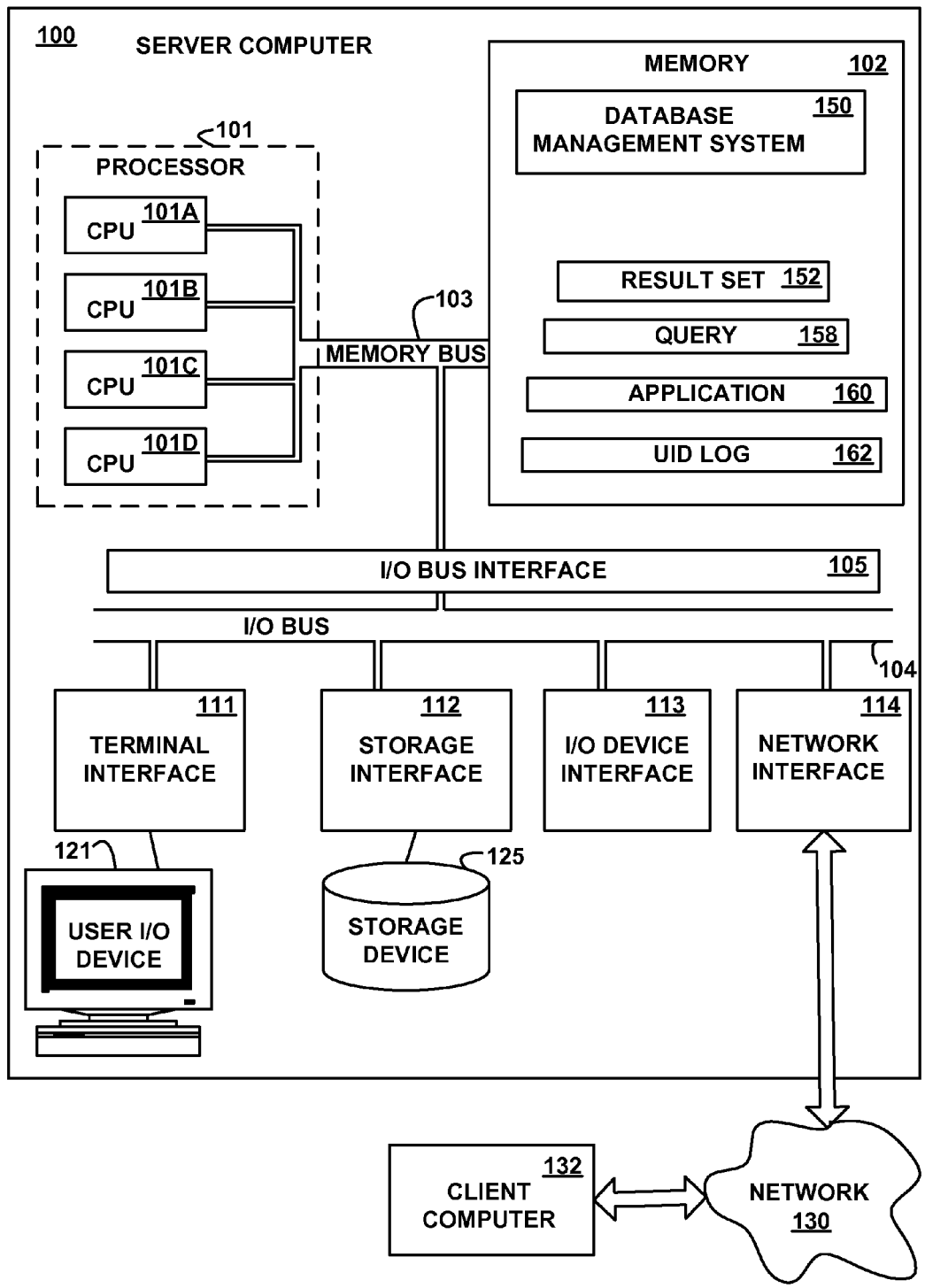
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the computer system 100 comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes a DBMS 150, a result set 152, a query 158, an application 160, and a UID (unique identifier) log 162. Although the DBMS 150, the result set 152, the query 158, the application 160, and the UID log 162 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the DBMS 150, the result set 152, the query 158, the application 160, and the UID log 162 are illustrated as being contained within the main memory 102, these elements are not necessarily all completely contained in the same storage device at the same time. Further, although the DBMS 150, the result set 152, the query 158, the application 160, and the UID log 162 are illustrated as being separate entities, in other embodiments some of them, portions of some of them, or all of them may be packaged together.

In an embodiment, the DBMS 150 and/or the application 160 comprise instructions or statements that execute on the processor 101 or instructions or statements that are interpreted by instructions or statements that execute on the processor 101, to carry out the functions as further described below with reference to FIGS. 2, 3, 4, 5, 6, and 7. In another embodiment, the DBMS 150 and/or the application 160 are implemented in hardware via semiconductor devices, chips, logical gates, circuits, circuit cards, and/or other physical hardware devices in lieu of, or in addition to, a processor-based system. In an embodiment, the DBMS 150 and/or the application 160 comprise data in addition to instructions or statements. In various embodiments, the application 160 is a user application, a third-party application, an operating system, or any portion, multiple, or combination thereof.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the main memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer system 100 and the computer system 132. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The computer system 132 may comprise some or all of the hardware and/or computer program elements of the computer system 100.

FIG. 1 is intended to depict the representative major components of the computer system 100, the network 130, and the computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency (RF), or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
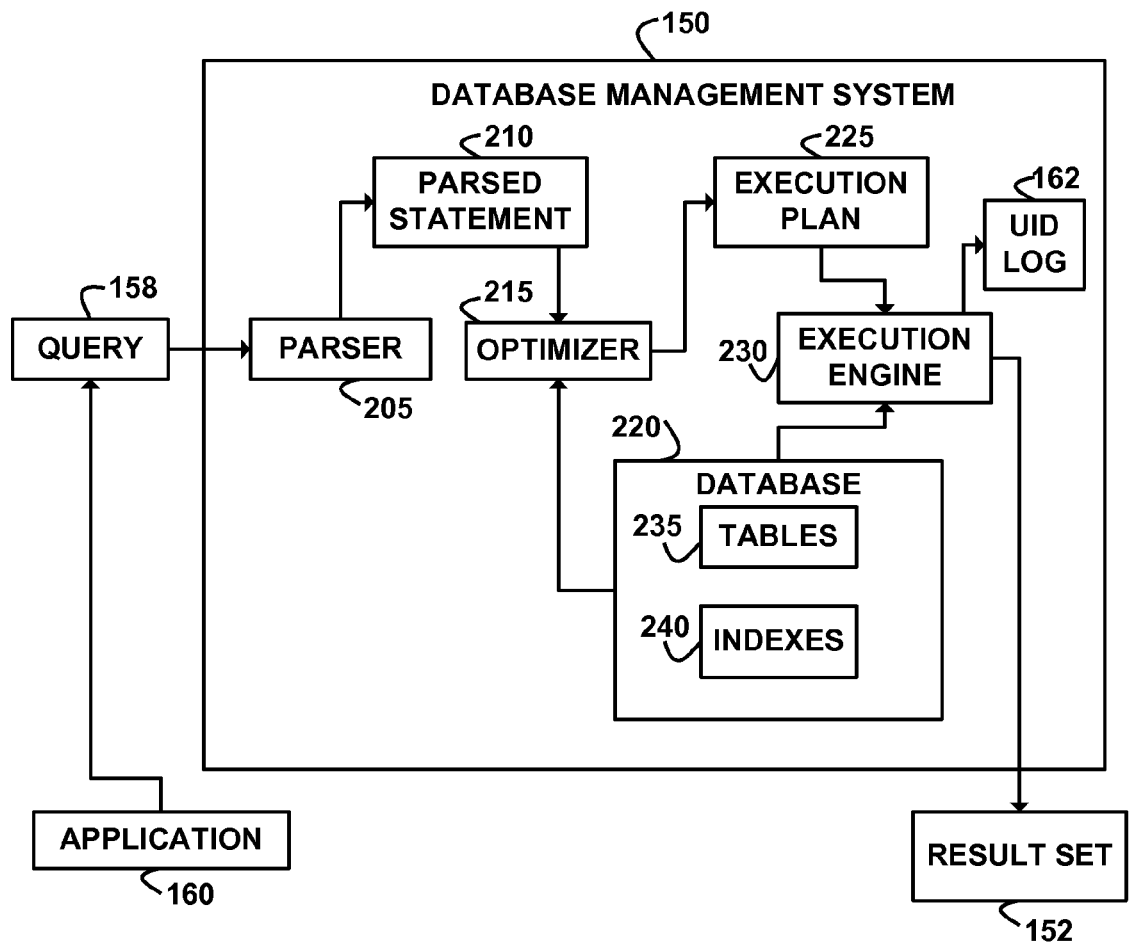
FIG. 2 depicts a block diagram of an example database management system, according to an embodiment of the invention.

FIG. 2 depicts a block diagram of an example DBMS 150, according to an embodiment of the invention. The DBMS 150 comprises a UID log 162, a parser 205, a optimizer 215, an execution engine 230 and a database 220. The database 220 comprises tables 235 and one or more indexes 240. The tables 235 organizes data in rows, which represent individual entries, tuples, or records and columns, fields, or attributes, which define what is stored in each row, entry, tuple, or record. Each table 235 has a unique name within the database 220 and each column has a unique name within the particular table 235. The indexes 240 are data structures that inform the DBMS 150 of the location of a certain row in a table 235 given an indexed column value.

The parser 205 in the DBMS 150 receives the query 158 from the application 160. The query 158 requests that the DBMS 150 search for or find a row or combination of rows of data and store the data from those found rows into the result set 152 that meet or satisfy the criteria, keys, and or values specified by the query 158. In an embodiment, the application 160 sends the same query 158 multiple times to the DBMS 150, which may or may not result in a different result set 152, depending on whether the data in the DBMS 150 has changed between occurrences of the query 158. The parser 205 generates a parsed statement 210 from the query 158, which the parser 205 sends to the optimizer 215. The optimizer 215 performs query optimization on the parsed statement 210. As a result of query optimization, the optimizer 215 generates one or more execution plans 225, using data such as platform capabilities, query content information, etc., that is stored in the database 220. Once generated, the optimizer 215 sends the execution plan 225 to the execution engine 230, which executes the query 158 using the execution plan 225, the indexes 240, and the UID log 162, in order to find and retrieve the data in the database tables 235 in the database 220 that satisfies the criteria of the query 158. The execution engine 230 stores the resultant data that satisfies the criteria specified by the query 158 into the result set 152, which is returned to the application 160 as a response to the query 158. In an embodiment, the DBMS 150 stores various thresholds into the execution plan 225. The DBMS 150 may receive the various thresholds from the application 160, from a user, or from a database administrator, or the thresholds may be set by a designer of the optimizer 215.

Figure 3:
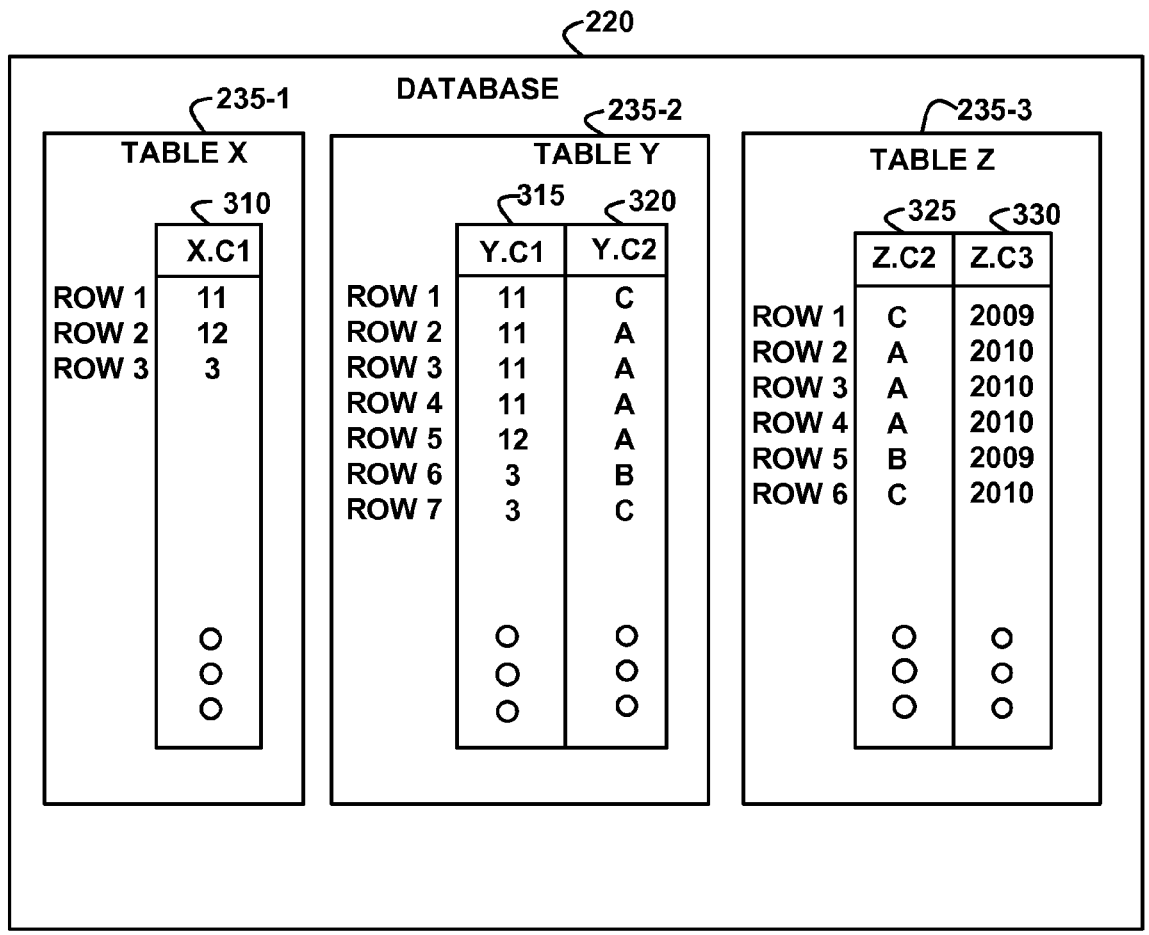
FIG. 3 depicts a block diagram of an example data structure for a database, according to an embodiment of the invention.

FIG. 3 depicts a block diagram of an example data structure for a database 220, according to an embodiment of the invention. The example database 220 comprises an example table x 235-1, an example table y 235-2, and an example table z 235-3. The table x 235-1 comprises the column x.c1 310. The table y 235-2 comprises the column y.c1 315 and the column y.c2 320. The table z 235-3 comprises the column z.c2 325 and the column z.c3 330. The columns 310 and 315 share the same column name or identifier "c1," and the columns 320 and 325 share the same column name or identifier "c2." Thus, the columns are uniquely identified herein using the notation x.c1 (referring to the column 310 in the table x 235-1), y.c1 (referring to the column 315 in the table y 235-2), y.c2 (referring to the column 320 in the table y 235-2), z.c2 (referring to column 325 in the table 235-3), and z.c3 (referring to the column 330 in the table 235-3).

Each table in the example database 220 is divided into rows and columns. For example, the table x 235-1 comprises a first row of (11) with "11" stored in the column x.c1 310; a second row of (12) with "12" stored in the column x.c1 310; a third row of (3) with "3" stored in the column x.c1 310, etc. The table x 235-1 illustrates row identifiers ("row 1," "row 2," "row 3," etc.), which identify the respective rows in the table. In another embodiment, the row identifiers are addresses (either absolute, relative, physical, logical, or virtual addresses) that identify the storage location of the respective row. In an embodiment, the row identifiers are pointed to by addresses or identifiers in the index 240. In another embodiment, the row identifiers are unique values in a column. Row identifiers exist for all of the tables and rows.

As another example, the table Y 235-2 comprises a first row of (11, C) with "11" stored in the column y.c1 315 and "C" stored in the column y.c2 320; a second row of (11, A) with "11" stored in the column y.c1 315 and "A" stored in the column y.c2 320; a third row of (11, A) with "11" stored in the column y.c1 315 and "A" stored in the column y.c2 320, etc.

As another example, the table z 235-3 comprises a first row of (C, 2009) with "C" stored in the column z.c2 325 and "2009" stored in the column z.c3 330; a second row of (A, 2010) with "A" stored in the column z.c2 325 and "2010" stored in the column z.c3 330; a third row of (A, 2010) with "A" stored in the column z.c2 325 and "2010" stored in the column z.c3 330, etc.

Figure 4:
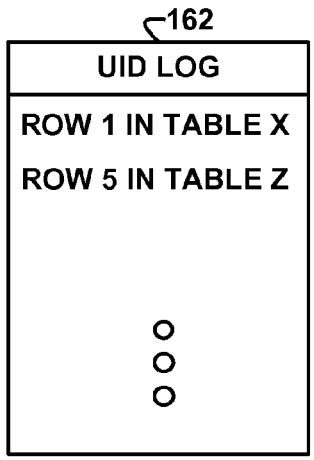
FIG. 4 depicts a block diagram of an example data structure for a unique identifier log, according to an embodiment of the invention.

FIG. 4 depicts a block diagram of an example data structure for the unique identifier log 162, according to an embodiment of the invention. In an embodiment, the UID log 162 comprises unique identifiers that uniquely identify the rows from a driver source in the database 220 that are in the result set 152 and that satisfy the query 158. In an embodiment, the UID log 162 also comprises unique identifiers of rows from the driver source in the database 220 that have been processed by the execution of an execution plan 225, but have not been added to the result set 152 because those rows do not satisfy the query 158. Being processed means that the DBMS 150 has read the rows, compared the read rows to the criteria of the query 158, and determined that the rows do not satisfy the criteria of the query 158. In various embodiments, a unique identifier comprises a row identifier, a column identifier, a unique value of a row in a column, and/or a table identifier, or any combination or multiple thereof. A driver source is one designated table in the join order of an execution plan 225. In an embodiment, the DBMS 150 designates the driver source as the first table in the join order of an execution plan 225, and each execution plan 225 that implements the same query 158 may have a different join order and a different designated driver source.

In another embodiment, each execution plan 225 that implements the same query 158 is different, but has a same join order. An example of execution plans that are different but have the same join order is execution plans that specify accessing the same table in different ways, such as a scan of an index of a table and randomly accessing the table using the index value in one execution plan versus a scan of the table (from beginning to end in row order) without using the index in another execution plan. Another example is execution plans that have a different degree of parallelism, such as an execution plan that specifies using one task to execute the execution plan versus another execution plan that specifies using two tasks in parallel execution.

The example data shown in FIG. 4 illustrates that the UID log 162 comprises identifiers of rows from different tables that were identified as driver sources by different execution plans. Thus, in an embodiment, the execution of all execution plans 225 read and write the unique identifiers to the same UID log 162. In another embodiment, the execution of each execution plan 225 stores unique identifiers to its own UID log and reads unique identifiers from all UID logs of all other execution plans 225.

In an embodiment, execution of an execution plan 225 does not add UIDs to the UID log 162 until the DBMS 150 decides to start another thread that executes another execution plan. Once the DBMS 150 has decided to start another thread, various embodiments include: rescanning the driver source, comparing the unique identifiers in the driver source to the UIDs of the returned rows in the result set 152, and adding the unique identifiers that satisfy the query 158 to the UID log 162; or restarting the execution of the original execution plan and then storing the unique identifiers to the UID log 162.

Figure 5:
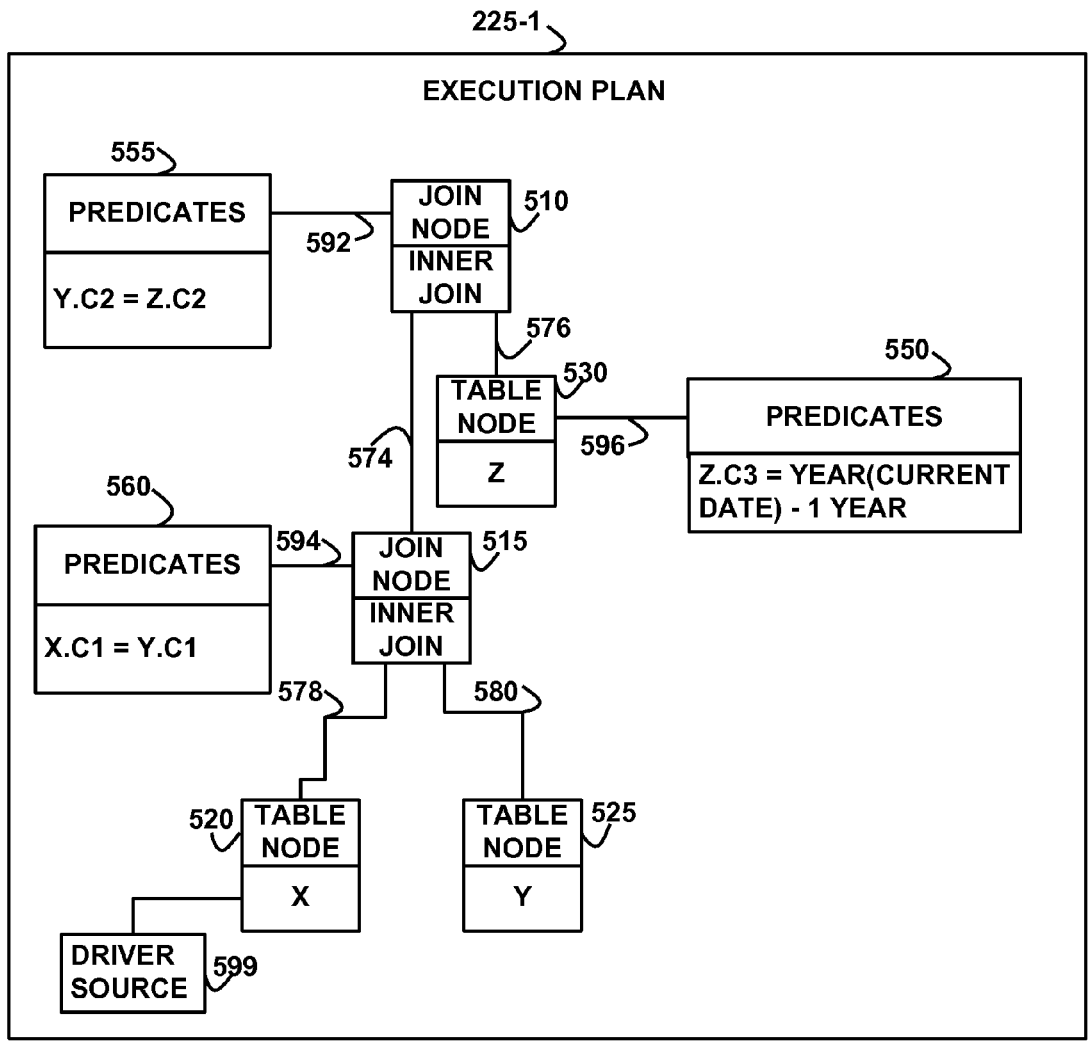
FIG. 5 depicts a block diagram of an example data structure for an execution plan that implements a query with a first join order and a first driver source, according to an embodiment of the invention.

FIG. 5 depicts a block diagram of an example execution plan 225-1 that implements a query with a first join order and a first driver source, according to an embodiment of the invention. The execution plan 225-1 is an example of, and is generically referred to by, the execution plan 225 (FIG. 1). The execution plan 225-1 comprises a tree graph, representing the join operations that implement the query 158 when executed. The tree graph of the execution plan 225-1 comprises join nodes 510 and 515; table nodes 520, 525, and 530; predicates 550, 555, and 560; links 574, 576, 578, and 580; and links 592, 594, and 596. The table node 520 represents the table x 235-1. The table node 525 represents the table y 235-2. The table node 530 represents the table z 235-3. The execution plan 225-1 further comprises a driver source identifier 599 that identifies the table represented by the table node 520 as the driver source. In other embodiments, the driver source identifier 599 is optional or not used. For example, the DBMS 150 may use the table represented by the first table node in the join order as the driver source. As another example, the DBMS 150 may add a clause to the predicates 560 indicating that, in order for the predicates 560 to be satisfied, the UIDs of rows from the first table in the join order must not already be present in the UID log 162, which causes the execution of the execution plan 225 to not save rows to the result set 152 that have already been saved to the result set 152 by the execution of another execution plan.

A tree graph takes its name from an analogy to trees in nature, which have a hierarchical organization of branches and leaves. For example, a leaf is connected to a small branch, which further is connected to a large branch, and all branches of the tree have a common starting point at the root. Analogously, the nodes 510, 515, 520, 525, and 530 in the tree graph of the execution plan 225-1 have a hierarchical organization, in that the join node 510 has a relationship with another join node 515, which itself may have a further relationship with another node, and so on. Thus, the nodes may be divided into groups and sub-groups, which ultimately all have a relationship to the root or head node 510. To define a tree more formally, a tree data structure defines the hierarchical organization of nodes. Hence, a tree is a finite set, T, of one or more of nodes, such that a) one specially designated node is called the root of the entire tree; and b) the remaining nodes (excluding the root) are partitioned into m>=0 disjoint sets $T_1, \ldots Tm$, and each of these sets is in turn a tree. The trees $T1, \ldots, Tm$ are called the subtrees of the root. Thus, every node in a tree is the root of some subtree contained in the whole tree. The number of subtrees of a node is called the degree of that node. A node of degree zero is called a terminal compute node or a leaf. A non-terminal node is called a branch node. The level of a node with respect to T is defined by saying that the root node has level 0, and other nodes have a level that is one higher than they have with respect to the subtree that contains them. Each root is the parent of the roots of its subtrees, the latter are siblings, and they are also the children of their parent. Each root is an ancestor of all of the nodes in all of the root's subtrees. The nodes in the subtrees of a root node are the root's descendants. The root node of the entire tree has no parent node.

A tree graph, with parent and child nodes, is merely a logical representation of a query execution, which aids in understanding how the execution engine 230 executes a particular query 158. But, the execution plan 225 generated by the optimizer 215 may comprise code understandable and executable by the execution engine 230. This code does not require parent nodes and child nodes but, instead, comprises logic that is represented by a tree graph model having such nodes and connections and may be implemented as other types of data structures as well. Accordingly, while embodiments of the invention are described herein using such tree graph terminology, actual creation and modification of a tree graph are not required.

Using the example tree of the execution plan 225-1 of FIG. 5, the root node is the node 510. The root node 510 is the parent of its child nodes 515 and 530. The node 515 is the parent of its child nodes 520 and 525. The nodes 520, 525, and 530 have no child nodes, so they are leaf nodes. The ancestors of the node 520 are the nodes 515 and 510. The ancestors of the node 525 are the nodes 515 and 510. The ancestor of the node 530 is the node 510. The root node 510 has no ancestors. The links 574, 576, 578, and 580 each connect, point to, or contain the address of two adjacent nodes, and allow the DBMS 150 to find the child nodes of a parent node and find the parent node of a child node. The links 592, 594, and 596 each connect to, point to, or contain the address of a predicate, and allow the DBMS 150 to find the predicate of a node. In this example, the example query 158 that the example execution plan 225-1 implements may be expressed as: "select * from x, y, z, where x.c1=y.c1 and y.c2=z.c2 and z.c3=year (current date)-1 year." The tree graph of the execution plan 225-1 illustrates one example implementation and one example join order for the example query 158, but other implementations and join orders for this query 158 also exist, including embodiments that do not use a tree and that do not use a graph.

Each of the predicates 550, 555, and 560 is connected to a respective node 530, 510, and 515. The predicates 550, 555, and 560 each represent a portion of the query 158 and comprise respective conditional criteria expressions, which the DBMS 150 evaluates to either true or false by substituting data from the rows retrieved from the table nodes (that are connected to the predicate or that are the child node of a join node that is connected to the predicate) into variables in the expression that match column identifiers in the rows. In various embodiments, the predicates specify any multiple, and/or combination of: data; columns, fields, or keys; functions, calls, invocations, methods, classes, or applets; relational operators (e.g., greater than, less than, equal to, not equal to, greater than or equal to, less than or equal to, or any other relational operator); logical operators (e.g., AND, OR, XOR, NOT, NOR, NAND, or any other logical operator); arithmetic operators (e.g., multiplication, division, addition, subtraction, bases, powers, logarithms, or any other arithmetic operators); and register operations (e.g., shift left, shift right operations, or any other register operation); and the relational operators, the logical operators, the arithmetic operators, and the register operations may have any number of arguments or operands (e.g., they may be unary, binary, ternary, or n-ary).

The DBMS 150 reads a join node, and in response, reads a row from a child table node or nodes of the join node, substitutes the data from the columns in the read row(s) that has the same table and column identifier as specified in the predicate that is connected to the join node, and evaluates the resultant predicate expression to either true or false. If the predicate expression evaluates to true, then the read row satisfies or meets the connected predicate, so the DBMS 150 saves the read row to the result set 152 if the unique identifier of the row from the driver source is not already in the UID log 162. If the unique identifier of the row from the driver source is already in the UID log 162, then the DBMS 150 does not add the row to the result set 152. If the predicate expression evaluates to false, then the read row does not satisfy or meet the predicate, so the DBMS 150 excludes the read row from the result set 152.

The join nodes represents join operations of tables whose rows satisfy the connected predicate. In various embodiments, the join operations may comprise inner joins, equijoins, natural joins, outer joins, left outer joins, right outer joins, full outer joins, exception joins, and self joins. An inner join between two tables results in only the rows matching certain selection criteria to be returned in the result set 152. An outer join, such as a left join of a table A and a table B (according to a set of selection criteria) returns all matching rows as well as those rows in table A not having a match in table B. The matching rows have the values of all their fields populated by the data from table A and table B. But, the non-matching rows from table A will have a null value, or other default character, in the fields from table B. Another outer join, such as a right join of table A and table B, also returns all the matching rows but, unlike the left join, returns those rows in table B not having a matching row in table A. An exception join of table A and table B returns a result set 152 of those rows in table A for which no matching row in table B exists.

The join node 515 represents a join operation of the tables represented by the child table nodes 520 and 525 using the connected predicates 560. The join node 510 represents a join operation using the predicates 555 of the intermediate result set returned by the join operation of the join node 515 and another intermediate result set created by the child table node 530 using the predicates 550. In an embodiment, the join nodes represent logic in the DBMS 150 that performs the join operation that finds rows in the child table nodes, whose column values satisfy the criteria of the predicates when the logic of the join node substitutes the column values of the found rows into the placeholders or variables in the predicates that have the same name or identifier as the column identifiers in the rows.

In operation, the DBMS 150 executes the query 158 using the execution plan 225-1 as follows. The DBMS 150 begins traversing the nodes at the root or head node and encounters (reads) the head join node 510. Since the join node 510 is not a table node, the DBMS 150 travels to the left child join node 515 of the join node 510 via the link 574, in search of a first row. The DBMS 150 then encounters (reads) the join node 515. Since the join node 515 is not a table node, the DBMS 150 again travels to the left child node 520 of the node 515 via the link 578, in search of a first row. The DBMS 150 then encounters the table node 520 and retrieves the first row from the table represented by the table node 520, using a scan operation. In a scan operation, the DBMS 150 reads rows from the beginning to the end of a table, without using the index 240 to randomly access the table.

The DBMS 150 then travels to the right child node 525 of the node 515, encounters (reads) the table node 525, and searches for a second row in the table identified by the table node 525 that satisfies the selection criteria of the connected predicates 560 of the join node 515. If the DBMS 150 does not find a second row in the table identified by the table node 525 that satisfies the selection criteria of the connected predicates 560 of the join node 515, then the DBMS 150 returns to the table node 520 and scans the table x for the next row and returns to the table node 525 and once again searches for a second row in the table y identified by the table node 525 that satisfies the selection criteria of the predicates 560 of the join node 515.

Once a matching row in the table identified by the table node 525 is identified that satisfies the selection criteria of the predicates 560, the DBMS 150 returns the found first row (read in a scan operation from the table represented by the node 520) and the second row (read from the table node 525) in an intermediate result set to the join node 510. The DBMS 150 then travels to the right child table node 530 and searches for a third row in the table z identified by the table node 530 that satisfies or meets the predicates 550 and 555. Notice that, in determining whether or not a row in the table Z satisfies the predicates 555, the DBMS 150 uses the second row that was found in the table node 525 and was returned in the intermediate result set, in order to compare y.c2=z.c2. If the DBMS 150 does not find a row in the table 530 that satisfies the predicates 550 and 555 for the intermediate result set returned from the join node 515, then the DBMS 150 returns to the join node 515 and re-performs the join, retrieving the next row from the table x (the table node 520) and finding a row in the table y (the table node 525) that satisfies the predicates 560 before returning to the join node 510 and once again searching for a third row in the table z (the table node 530) that meets the predicates 550 and 555.

Once the DBMS 150 has found a third row in the table z (the table node 530) that satisfies the criteria of the predicates 550 and 555, the DBMS 150 returns the intermediate result set of the first row from the table x, the second row from the table y, and the third row from the table z that meets the criteria of the predicates 550, 555, and 560 to the join node 510. The DBMS 150 then adds the rows that meet the predicates to the result set 152 and adds the unique identifier that identifies the rows from the driver source, as previously described above with reference to FIG. 4.

Once all rows in the table z are scanned and any matches are processed by the DBMS 150 at the join node 510, the DBMS 150 retrieves the next row from the table x, and repeats the aforementioned sequence of operations. Thus, the table node 520 representing the table x 235-1 is the first table in the join order of the execution plan 225-1 because the DBMS 150 scans rows from the table x 235-1 prior to reading rows from any of the other tables (represented by the nodes 525 and 530) in the join order. The DBMS 150 designates the table x 235-1 represented by the table node 520 as the driver source for the execution plan 225-1 because the table node 520 is first in the join order. In another embodiment, the DBMS 150 designates any appropriate table as the driver source. The table y 235-2 represented by the node 525 is second in the join order because the DBMS 150 reads rows from the table y 235-2 after reading rows from the table x in order to determine if the predicates 560 are satisfied and prior to reading rows from the table z 235-3, represented by the table node 530. The table z 235-3 represented by the node 530 is the third, or last, table in the join order because the DBMS 150 reads rows from the table z 235-3 after reading rows from the table x 235-1 and the table y 235-2, in order to determine if the predicates 550 and 555 are satisfied.

Figure 6:
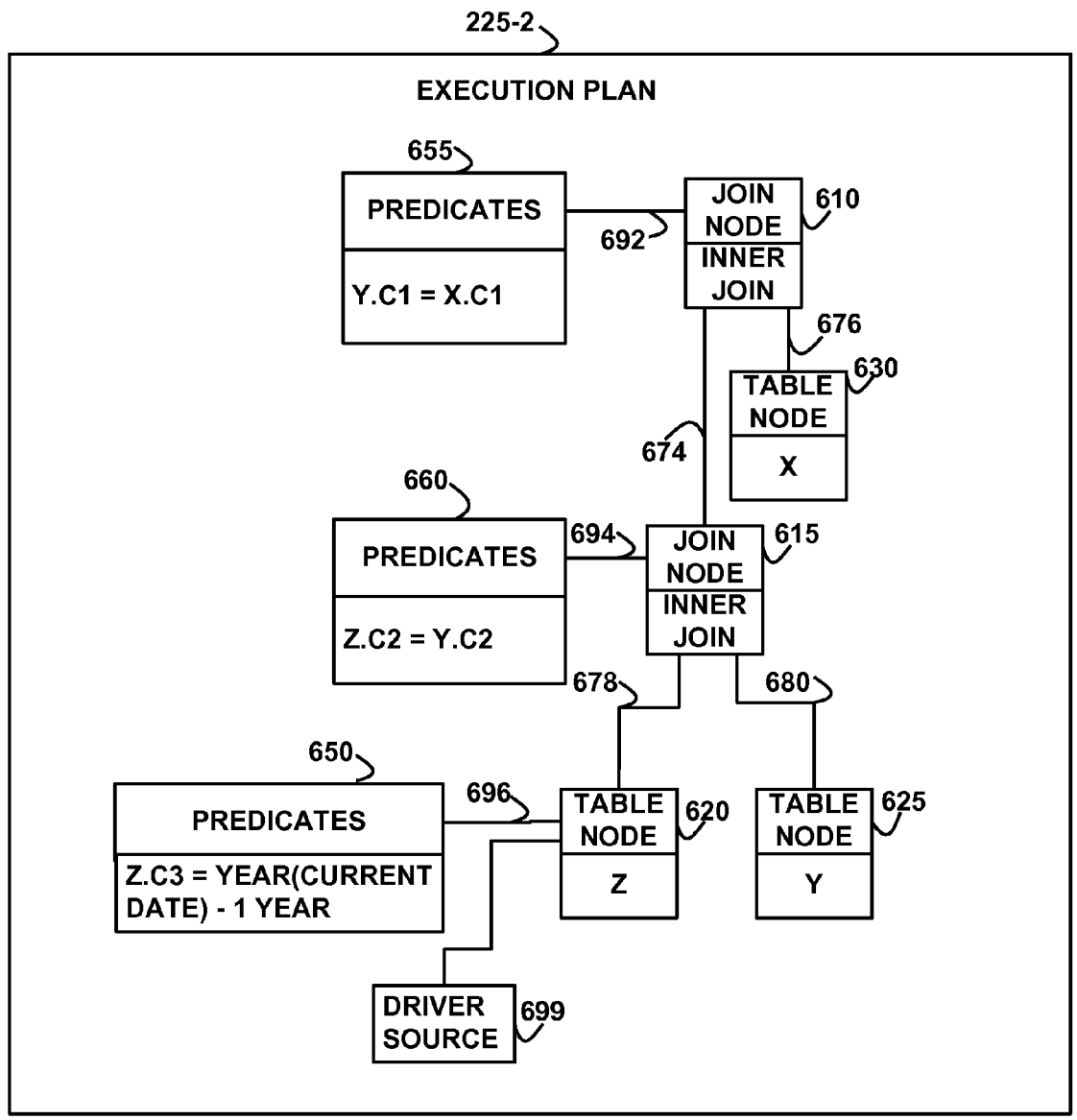
FIG. 6 depicts a block diagram of another example data structure for an execution plan that implements the query with a second join order and a second driver source, according to an embodiment of the invention.

FIG. 6 depicts a block diagram of another example execution plan 225-2 that implements the query 158 with a second join order and a second driver source, according to an embodiment of the invention. In this example, the query 158 that the execution plan 225-2 implements is the same as the query 158 implemented by the execution plan 225-1 (FIG. 5), but the execution plan 225-2 has a different join order and a different driver source than the execution plan 225-1.

The execution plan 225-2 is an example of the execution plan 225 (FIG. 1). The execution plan 225-2 comprises a tree graph, representing the join operations that implement the query 158 when executed. The tree graph of the execution plan 225-2 comprises join nodes 610 and 615; table nodes 620, 625, and 630; predicates 650, 655, and 660; links 674, 676, 678, and 680; and links 692, 694, and 696. The table node 620 represents the table z 235-3. The table node 625 represents the table y 235-2. The table node 630 represents the table x 235-1. The execution plan 225-2 further comprises a driver source identifier 699 that identifies the table represented by the table node 620 as the driver source. In other embodiments, the driver source identifier 699 is optional or not used. In the execution plan 225-2, the table node 620 is first in the join order, the table node 625 is second in the join order, and the table node 630 is third and last in the join order.

Using the example data in the database 220 illustrated in FIG. 2 with the example execution plan 225-1, respectively, the DBMS 150 returns a row to the result set 152 that comprises the "row 1" from each of the table x 235-1, the table y 235-2, and the table z 235-3. Since the driver source in the execution plan 225-1 is the table node 520, the DBMS 150 stores an indication of the row 1 of the table x to the UID log 162. The DBMS 150 then reads the "row 6" from the table z 235-3, but discards this row and does not add it to the result set 152 because although the predicate 555 is satisfied (y.c2 of "C" in "row 1" of table y 235-2 equals z.c2 of "C" in "row 6" of table z 235-3), the predicate 550 is not satisfied by z.c3 of "2010" if the current year is 2010. The DBMS 150 then reads and ultimately discards "row 2" of table y 235-3 because "row 2" in the table z 235-3 (which contain a value of "A" in column z.c2 325 that matches the value of "A" in y.c2 320, satisfying the predicate 555) contains a value of "2010" in the column z.c3 330 of "2010," which does not satisfy the predicate 550. The DBMS 150 then reads and ultimately discards "row 3" and "row 4" of the table y 235-2 for the same reason.

This reading of rows that satisfy a predicate early in the join order but ultimately discarding of rows because of a predicate late in the join order that is not satisfied is known as a starvation join. In this example, the DBMS 150 detects the occurrence of the starvation join, and in response, creates another execution plan 225-2 with a different join order and a different driver source and starts the execution plan 225-2 executing concurrently with the execution of the execution plan 225-1. The execution of the execution plan 225-2 finds the same "row 1" from each table that satisfies the predicates 650, 655, and 660 that was previously found by the execution plan 225-1, but the execution of the execution plan 225-2 discards "row 1" from each table and does not add them to the result set 152 because "row 1" of table x is already identified in the UID log 162. The execution of the execution plan 225-2 then continues scanning the table z 235-3 (identified by the table node 620, which is the first table node in the join order) and discards "row 2," "row 3," and "row 4," as not meeting the predicates 650. The execution of the execution plan 225-2 then continues scanning the table z 235-3 and finds "row 5," which satisfies the predicates 650. The execution of the execution plan 225-2 then finds "row 6" in the table y 235-2 that satisfies the predicates 660 ("B" in y.c2 320 of table y 235-2 matches "B" in z.c2 325 of row 5 of table z 235-3), and "row 3" in table x 235-1 satisfies the predicates 655 ("3" in "row 6" of y.c1 315 in the table y 235-2 matches "3" in "row 3" of x.c1 310 in the table x 235-1). Since the UID of the "row 5" in the table z 235-3 is not present in the UID log 162, the execution of the execution plan 225-2 adds the UID of the "row 5" in the table z 235-3 to the UID log 162 and adds the returned rows to the result set 152. Thus in an embodiment, the DBMS 150 may detect the starvation join and start another execution plan executing (the execution plan 225-2, in this example), which may complete the query 158 faster than the original execution plan (the execution plan 225-1, in this example) while still using the returned rows of the original execution plan (the execution plan 225-1).

Figure 7:
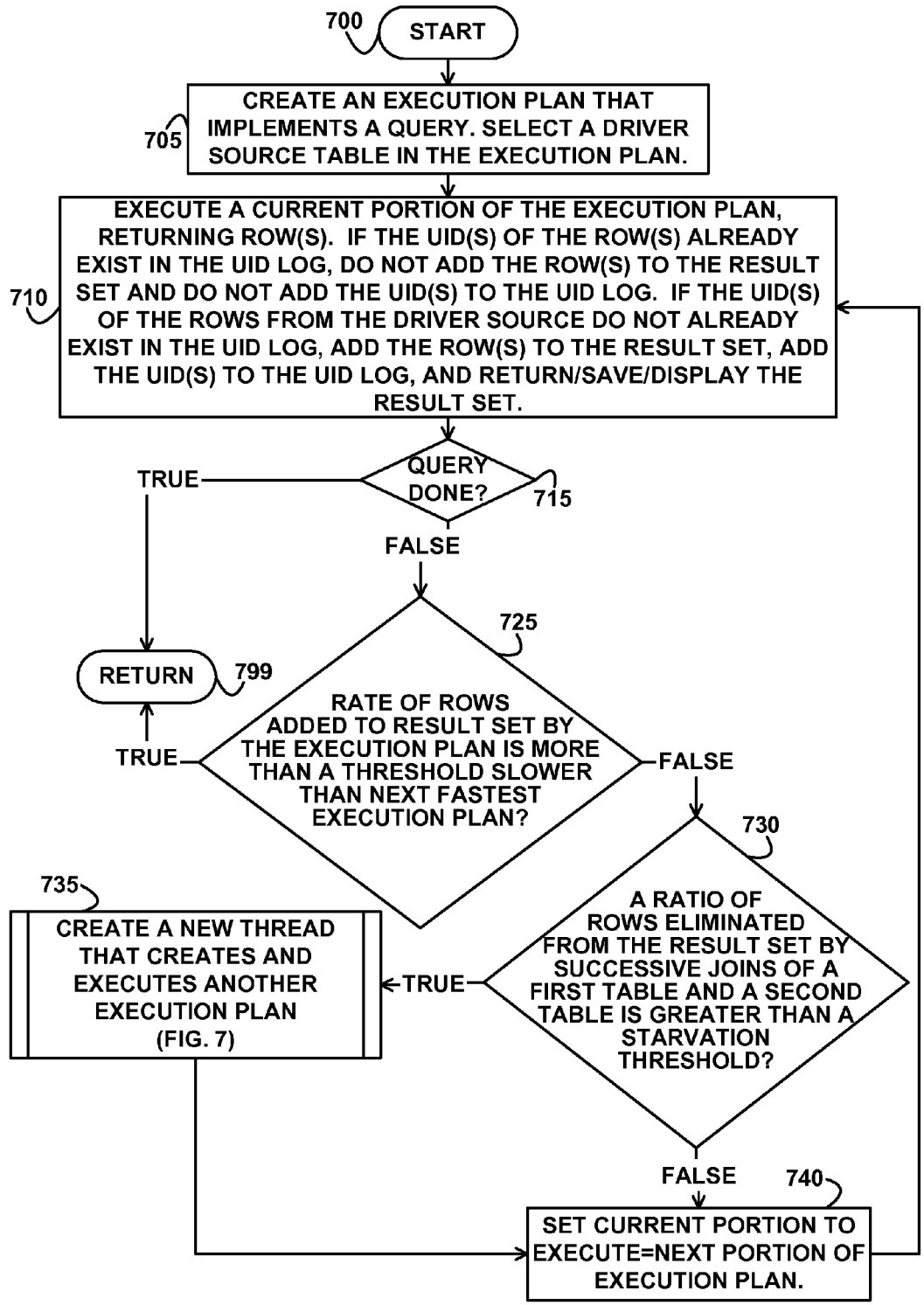
FIG. 7 depicts a flowchart of example processing for executing execution plans for the query, according to an embodiment of the invention.

FIG. 7 depicts a flowchart of example processing for executing execution plans for a query, according to an embodiment of the invention. The logic represented by FIG. 7 is reentrant and may be executed concurrently, substantially concurrently, or interleaved by multiple threads on the same or different processors, creating and executing different execution plans via multi-threading, multi-tasking, multi-programming, or multi-processing techniques. In another embodiment, the different execution plans may be executed sequentially. Control begins at block 700. Control then continues to block 705 where the DBMS 150 creates an execution plan that implements a query 158, such as the execution plan 225-1 or 225-1. The DBMS 150 selects and designates a driver source in the execution plan.

Control then continues to block 710 where the DBMS 150 executes a current portion of the execution plan, returning row(s). If the UID(s) of the row(s) already exist in the UID log 162, the DBMS 150 does not add those row(s) to the result set 152 and does not add the UID(s) to the UID log 162. If the UID(s) of the rows do not already exist in the UID log 162, the DBMS 150 adds the rows that do not already exist to the result set 152, adds the UID(s) of the driver source rows that do not already exist in the UID log 162 to the UID log 162, and returns the result set 152 to the user or application that requested the query 158, saves the result set 152, and/or displays the result set 152 via the user I/O device 121.

Control then continues to block 715 where the DBMS 150 determines whether the execution of any execution plan (whether executed by the current thread or any other thread) that implements the query 158 is complete. If the determination at block 715 is true, then the execution of any execution plan that implements the query 158 is complete and all rows that satisfy the query 158 have been found, so control continues to block 799 where the current thread of FIG. 7 ends or returns to the invoker.

If the determination at block 715 is false, then the execution of any execution plan that implements the query 158 is not complete and all rows that satisfy the query 158 have not been found, so control continues to block 725 where the DBMS 150 determines whether the rate of rows added to the result set 152 by the execution of the execution plan is more than a threshold slower than the rate that rows are added to the result set 152 by the execution of the next fastest execution plan.

If the determination at block 725 is true, then the rate of rows added to the result set 152 by the execution of the execution plan is more than a threshold slower than the rate that rows are added to the result set 152 by the execution of the next fastest execution plan, so control continues to block 799 where the logic of FIG. 7 returns, meaning that the current threads stops executing the current execution plan, but the execution of other execution plans that implement the same query continue unaffected.

If the determination at block 725 is false, then the rate of rows added to the result set 152 by the execution of the execution plan is not more than a threshold slower than the rate that rows are added to the result set 152 by the execution of the next fastest execution plan, so control continues to block 730 where the DBMS 150 determines whether the ratio of rows eliminated from the result set by successive joins (successive in the join order with no intervening join) of a first table and second table is greater than a starvation threshold. A join operation eliminates rows by removing or deleting rows from the result set 152 that do not satisfy the predicate that is connected to the join node that represents the join operation. If the ratio is greater than the starvation threshold, the DBMS has identified a starvation join condition, where a join of rows from a table (a second table that is later than a first table in the join order of the successive joins) later in the join order eliminates a large number of rows from the result set.

If the determination at block 730 is true, then the ratio of rows eliminated from the result set by successive joins of a first table and second table is greater than a starvation threshold, so control continues to block 735 where the DBMS 150 creates another thread that executes the logic of FIG. 7 and starts the other thread executing on the processor. The newly created thread creates and executes another execution plan that has a different join order than the execution plan executed by the current instance of FIG. 7. In another embodiment, newly created thread creates and executes another execution plan that has the same join order but that is different from the execution plan executed by the current instance of FIG. 7. The newly created thread saves rows to the same result set 152 and uses the same UID log 162 as the current thread. Control then continues to block 740 where the DBMS 150 sets the current portion for the execution plan to execute to be the next unexecuted portion for the execution plan. Control then returns to block 710 where the DBMS 150 executes the next current portion of the execution plan, as previously described above.

In another embodiment, if a UID is processed but the row identified by the UID is not added to the result set 152, the DBMS 150 adds the UID is added to the UID log 162, so that the execution of another execution plan does not need to consider the UID. In an embodiment, the DBMS 150 checks the UID log 162 prior to processing rows instead of after processing the rows. As used herein, a row that is processed but not added to the result set 152 means a row that has been read from a table but discarded without adding the row to the result set 152.

If the determination at block 730 is false, then the ratio of rows eliminated from the result set by successive joins of a first table and second table is not greater than a starvation threshold, so control continues to block 740 where the DBMS 150 sets the current portion for the execution plan to execute to be the next unexecuted portion for the execution plan, without creating a new thread. Control then returns to block 710 where the DBMS 150 executes the next current portion of the execution plan, as previously described above.

Thus, in an embodiment, a row is stored to a result set by executing an execution plan if that row was not already added to the result set by executing any other execution plan, so an intersection of the rows added to the result set by the executing of all different execution plans is an empty set. In this way, in an embodiment, better performance is provided than executing just one execution plan.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A computer-implemented method comprising:
designating a first driver source specified by a first execution plan that implements a query;
designating a second driver source specified by a second execution plan that implements the query;
executing a portion of the first execution plan;
executing a portion of the second execution plan;
if a unique identifier of a first row returned by the executing the portion of the first execution plan does not match all unique identifiers of all rows from the second driver source that were saved to a result set by the executing the portion of the second execution plan, adding the first row returned by the executing the portion of the first execution plan to the result set, and adding, to a unique identifier log, the unique identifier of the first row that was returned by the executing the portion of the first execution plan; and
if the unique identifier of the first row returned by the executing the first execution plan matches a unique identifier of a row from the second driver source that was saved to the result set by the executing the second execution plan, refraining from adding the first row, to the result set, by the executing the first execution plan and refraining from adding the unique identifier of the first row, to the unique identifier log, that was returned by the executing the first execution plan.

2. The method of claim 1, wherein the first execution plan is different from the second execution plan and the first driver source is different from the second driver source.

3. The method of claim 1, wherein the first execution plan comprises a first join order and the second execution plan comprises a second join order, wherein the first join order is different from the second join order, and wherein the executing the portion of the second execution plan is executed concurrently with the executing the portion of the first execution plan.

4. The method of claim 1, wherein the first execution plan comprises a join order of a plurality of tables and the second execution plan comprises the join order of the plurality of tables, and wherein the first execution plan specifies a scan of an index of one of the plurality of tables and the second execution plan specifies a scan of the one of the plurality of tables without using the index.

5. The method of claim 1, further comprising:
storing a first plurality of rows to the result set by the executing the portion of the first execution plan; and
storing a second plurality of rows to the result set by the executing the portion of the second execution plan, wherein an intersection of the first plurality of rows and the second plurality of rows is an empty set.

6. The method of claim 5, further comprising:
if a rate of the storing the first plurality of rows to the result set by the executing the portion of the first execution plan is more than a threshold value slower than a rate of storing the second plurality of rows to the result set by the executing the portion of the second execution plan, halting the executing the portion of the first execution plan.

7. A non-transitory computer-readable storage medium encoded with instructions, wherein the instructions when executed comprise:
designating a first driver source specified by a first execution plan that implements a query;
designating a second driver source specified by a second execution plan that implements the query;
executing a portion of the first execution plan;
executing a portion of the second execution plan;
if a unique identifier of a first row returned by the executing the portion of the first execution plan does not match all unique identifiers of all rows from the second driver source that were saved to a result set by the executing the portion of the second execution plan, adding the first row returned by the executing the portion of the first execution plan to the result set, and adding, to a unique identifier log, the unique identifier of the first row that was returned by the executing the portion of the first execution plan; and if the unique identifier of the first row returned by the executing the first execution plan matches a unique identifier of a row from the second driver source that was saved to the result set by the executing the second execution plan, refraining from adding the first row, to the result set, by the executing the first execution plan and refraining from adding the unique identifier of the first row, to the unique identifier log, that was returned by the executing the first execution plan.

8. The non-transitory computer-readable storage medium of claim 7, wherein the first execution plan is different from the second execution plan and the first driver source is different from the second driver source.

9. The non-transitory computer-readable storage medium of claim 7, wherein the first execution plan comprises a first join order and the second execution plan comprises a second join order, wherein the first join order is different from the second join order, and wherein the executing the portion of the second execution plan is executed concurrently with the executing the portion of the first execution plan.

10. The non-transitory computer-readable storage medium of claim 7, wherein the first execution plan comprises a join order of a plurality of tables and the second execution plan comprises the join order of the plurality of tables, and wherein the first execution plan specifies a scan of an index of one of the plurality of tables and the second execution plan specifies a scan of the one of the plurality of tables without using the index.

11. The non-transitory computer-readable storage medium of claim 7, further comprising:
storing a first plurality of rows to the result set by the executing the portion of the first execution plan; and
storing a second plurality of rows to the result set by the executing the portion of the second execution plan, wherein an intersection of the first plurality of rows and the second plurality of rows is an empty set.

12. The non-transitory computer-readable storage medium of claim 11, further comprising:
if a rate of the storing the first plurality of rows to the result set by the executing the portion of the first execution plan is more than a threshold value slower than a rate of storing the second plurality of rows to the result set by the executing the portion of the second execution plan, halting the executing the portion of the first execution plan.

13. A computer system comprising:
a processor; and
memory communicatively coupled to the processor, wherein the memory is encoded with instructions, wherein the instructions when executed by the processor comprise:
designating a first driver source specified by a first execution plan that implements a query,
designating a second driver source specified by a second execution plan that implements the query,
executing a portion of the first execution plan;
executing a portion of the second execution plan,
if a unique identifier of a first row returned by the executing the portion of the first execution plan does not match all unique identifiers of all rows from the second driver source that were saved to a result set by the executing the portion of the second execution plan, adding the first row returned by the executing the portion of the first execution plan to the result set, and adding, to a unique identifier log, the unique identifier of the first row that was returned by the executing the portion of the first execution plan, and
if the unique identifier of the first row returned by the executing the first execution plan matches a unique identifier of a row from the second driver source that was saved to the result set by the executing the second execution plan, refraining from adding the first row, to the result set, by the executing the first execution plan and refraining from adding the unique identifier of the first row, to the unique identifier log, that was returned by the executing the first execution plan.

14. The computer system of claim 13, wherein the first execution plan is different from the second execution plan and the first driver source is different from the second driver source.

15. The computer system of claim 13, wherein the first execution plan comprises a first join order and the second execution plan comprises a second join order, wherein the first join order is different from the second join order, and wherein the executing the portion of the second execution plan is executed concurrently with the executing the portion of the first execution plan.

16. The computer system of claim 13, wherein the first execution plan comprises a join order of a plurality of tables and the second execution plan comprises the join order of the plurality of tables, and wherein the first execution plan specifies a scan of an index of one of the plurality of tables and the second execution plan specifies a scan of the one of the plurality of tables without using the index.

17. The computer system of claim 13, wherein the instructions further comprise:
storing a first plurality of rows to the result set by the executing the portion of the first execution plan; and
storing a second plurality of rows to the result set by the executing the portion of the second execution plan, wherein an intersection of the first plurality of rows and the second plurality of rows is an empty set.

18. The computer system of claim 17, wherein the instructions further comprise:
if a rate of the storing the first plurality of rows to the result set by the executing the portion of the first execution plan is more than a threshold value slower than a rate of storing the second plurality of rows to the result set by the executing the portion of the second execution plan, halting the executing the portion of the first execution plan.

* * * * *